United States Patent
Carchidi et al.

(10) Patent No.: US 9,340,685 B2
(45) Date of Patent: May 17, 2016

(54) HASE RHEOLOGY MODIFIER VAE EMULSION COPOLYMER COMPOSITION

(71) Applicant: Rohm and Haas Company, Philadelphia, PA (US)

(72) Inventors: Matthew J. Carchidi, Norwood, PA (US); John J. Rabasco, Allentown, PA (US); Jaclynn Unangst, Irvine, CA (US); Antony K. Van Dyk, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/501,483

(22) Filed: Sep. 30, 2014

(65) Prior Publication Data

US 2015/0094398 A1    Apr. 2, 2015

Related U.S. Application Data

(60) Provisional application No. 61/884,506, filed on Sep. 30, 2013.

(51) Int. Cl.
  *C09D 7/00*     (2006.01)
  *C09D 131/04*   (2006.01)
  *C09D 133/06*   (2006.01)

(52) U.S. Cl.
  CPC ............. *C09D 7/002* (2013.01); *C09D 131/04* (2013.01); *C09D 133/064* (2013.01); *C08L 2201/54* (2013.01)

(58) Field of Classification Search
  CPC ...... C09D 133/08; C09D 131/04; C08K 5/16; A61K 8/46; C08L 31/02
  USPC ............ 524/186, 523, 556; 424/401; 427/391
  See application file for complete search history.

(56) References Cited

U.S. PATENT DOCUMENTS

| | | | |
|---|---|---|---|
| 6,063,857 A | 5/2000 | Greenblatt et al. | |
| 7,288,616 B2 | 10/2007 | Tamareselvy et al. | |
| 2006/0039939 A1* | 2/2006 | Lai et al. ...................... | 424/401 |
| 2010/0056696 A1 | 3/2010 | Poole et al. | |
| 2010/0173086 A1* | 7/2010 | Dungworth et al. .......... | 427/391 |
| 2011/0237745 A1 | 9/2011 | Bobsein et al. | |
| 2011/0319500 A1 | 12/2011 | Suau | |
| 2011/0319561 A1 | 12/2011 | Suau | |
| 2012/0231056 A1* | 9/2012 | Souzy .................... | A61K 8/068 424/401 |
| 2014/0114012 A1* | 4/2014 | Fasula et al. .................. | 524/523 |

FOREIGN PATENT DOCUMENTS

| | | | | |
|---|---|---|---|---|
| CA | 2730176 A1 * | 1/2010 | .......... | C09D 131/04 |
| EP | 0705852 A1 | 4/1996 | | |
| WO | 2013002999 A1 | 1/2013 | | |
| WO | 2013045377 A1 | 4/2013 | | |

OTHER PUBLICATIONS

Dow Chemical Company, Glass Transition Temperature of Rhoplex VSR-50, Acrylic binder.*

* cited by examiner

*Primary Examiner* — Nicole M Buie-Hatcher
(74) *Attorney, Agent, or Firm* — Reid S. Willis

(57) ABSTRACT

The present invention relates to a composition comprising a vinyl acetate copolymer and a HASE thickener comprising structural units of ethyl acrylate, methacrylic acid, acrylic acid, and a hydrophobic macromonomer. The composition of the present invention shows an improvement in heat aged stability over a vinyl acetate copolymer based paint thickened with a HASE that does not include structural units of acrylic acid.

7 Claims, No Drawings

HASE RHEOLOGY MODIFIER VAE EMULSION COPOLYMER COMPOSITION

BACKGROUND OF THE INVENTION

Rheology modifiers impart desirable rheological properties to coating formulations over a wide shear rate range. Many paints made with vinyl acetate-ethylene copolymer (VAE) based binders use cellulosic thickeners such as hydroxyethyl cellulose (HEC), hydroxymethylethyl cellulose (HMEC), and hydrophobically modified HEC (HM-HEC) to achieve a desirable rheological profile. Cellulosic thickeners also impart heat age stability to such paints, resulting in stable viscosities after exposure to elevated temperature conditions.

Synthetic thickeners such as hydrophobically modified urethane polymers (HEUR) and hydrophobically modified alkali soluble emulsions (HASE) are also capable of thickening VAE based paints to achieve desirable rheological properties. HEUR rheology modifiers have the disadvantage of being too expensive for this class of paint formulations; moreover, matching the rheological performance of HEC thickeners with HEUR thickeners has proven to be a challenge, presumably because HECs thicken paints by way of a volume exclusion mechanism, whereas HEURs thicken paints via an associative thickening mechanism.

HASE thickeners are attractive low cost alternatives to HECs. For example, ACRYSOL™ DR-110 Rheology Modifier (A Trademark of The Dow Chemical Company or its Affiliates) was recently developed to replace HEC in acrylic based paint formulations. VAE paints thickened with DR-110 offer an attractive rheological profile compared to HEC thickened VAE paints; nevertheless, DR-110 thickened VAE based paints tend to be unstable and gel upon heat aging. It would therefore be desirable to find a low cost alternative to HECs to use as thickeners is VAE based paints that are heat age stable.

SUMMARY OF THE INVENTION

The present invention addresses a need in the art by providing a composition comprising an aqueous dispersion of a) a vinyl acetate copolymer having a $T_g$ in the range of $-10°$ C. to $50°$ C. and b) a hydrophobically modified alkali soluble emulsion (HASE) comprising, based on the weight of the HASE: i) from 45 to 60 weight percent structural units of ethyl acrylate; ii) from 30 to 45 weight percent structural units of methacrylic acid; iii) from 2.0 to 20 weight percent structural units of acrylic acid; and iv) from 0.1 to 10 weight percent hydrophobic macromolecular groups. The composition of the present invention addresses a need by providing a HASE thickened VAE based coating composition that is stable to heat aging.

DETAILED DESCRIPTION OF THE INVENTION

The present invention is composition comprising an aqueous dispersion of a) a vinyl acetate copolymer having a $T_g$ in the range of $-10°$ C. to $50°$ C. and b) a hydrophobically modified alkali soluble emulsion (HASE) comprising, based on the weight of the HASE: i) from 45 to 60 weight percent structural units of ethyl acrylate; ii) from 30 to 45 weight percent structural units of methacrylic acid; iii) from 2.0 to 20 weight percent structural units of acrylic acid; and iv) from 0.1 to 10 weight percent hydrophobic macromolecular groups. Preferably, the HASE has a total acid content of 40, more preferably from 43; to 52, more preferably to 48, and most preferably to 46 weight percent, based on the weight of the HASE.

As used herein, the term "structural units" refers to the remnant of the indicated monomer; thus a structural unit of ethyl acrylate is illustrated:

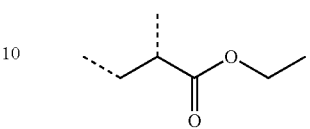

where the dotted lines represent the points of attachment to the polymer backbone.

The HASE further comprises hydrophobic macromolecular groups, which are preferably structural units of an ethylenically unsaturated polyethylene oxide (polyEO) macromonomer modified with an alkyl or aralkyl hydrophobe, as illustrated by either of following structures:

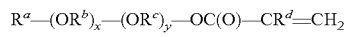

or

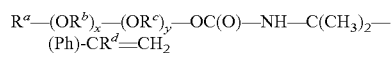

ethylenically unsaturated hydrophobically modified polyEO macromonomer where $R^a$ is the hydrophobic portion, preferably a $C_8$-$C_{24}$ alkyl or aralkyl group; x+y is 10 to 100, preferably 10 to 50; $R^b$ and $R^c$ are each independently $CH_2CH_2$, $CH_2CH(CH_3)$, or $CH_2CH_2CH_2CH_2$, preferably $R^b$ and $R^c$ are both $CH_2CH_2$; $R^d$ is H or $C_1$-$C_6$-alkyl, preferably methyl; and Ph is a phenylene group.

More preferably, the hydrophobic macromolecular groups are structural units of either or both of the following macromonomers:

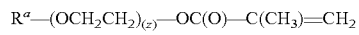

or

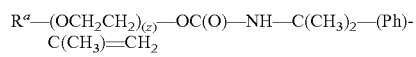

where $R^a$ is a $C_8$-$C_{24}$ alkyl or aralkyl group; z is 10 to 50; and Ph is a phenylene group.

The HASE preferably contains from 0.1 and more preferably from 0.5, to 10, more preferably to 5, and most preferably to 2 weight percent structural units of the hydrophobically modified macromonomer, based on the weight of the HASE. The HASE composition may also include from about 0.01 to about 1 weight percent of units of a cross-linking agent, which is typically a diethylenically unsaturated compound such as divinyl benzene, allyl methacrylate, diallyl phthalate, trimethylol propane triacrylate, 1,6-hexanediol diacrylate, ethylene glycol diacrylate or dimethacrylate. The HASE preferably has a weight average molecular weight $M_w$ ranging from 10,000 to several million Daltons. The concentration of HASE in the formulated paint is typically in the range of 0.1 to 1.0% based on total solids of the HASE and the total weight of the formulation.

The molecular weight of the HASE may be controlled by a chain transfer agent at a level preferably from about 0.05 to about 5 percent by weight, based on the weight of total monomers, to obtain relatively low molecular weight HASEs, which is some instances has found to be advantageous.

Examples of suitable chain transfer agents include hydroxyethyl mercaptan, β-mercaptopropionic acid, and $C_4$-$C_{22}$-alkylmercaptans such as n-dodecylmercaptan.

As used herein, the term vinyl acetate copolymer refers to a polymer comprising structural units of vinyl acetate and another monomer, with the proviso that the copolymer has a $T_g$, as measured using the Fox equation, from −10° C., preferably from 0° C., to 50° C., preferably to 40° C. Examples of suitable vinyl acetate copolymers include vinyl acetate ethylene copolymers (VAE), vinyl acetate Veova copolymers (VAVeova), and vinyl acetate butyl acrylate copolymer, with VAE being preferred. An example of a commercially available VAE latex binder is Mowilith LDM-1871 VAE.

The HASE preferably comprises, based on the weight of the HASE, from 45 to 56, more preferably 50 to 55 weight percent structural units of ethyl acrylate; and preferably from 4, more preferably from 8; to 15, more preferably 11 weight percent structural units of acrylic acid. Under certain conditions it is preferable that the HASE comprise structural units of a sulfonic acid monomer or a salt thereof. Examples of suitable sulfonic acid monomers include sulfoethyl methacrylate, anetholesulfonic acid, sulfopropyl methacrylate, 4-styrene sulfonic acid, vinyl sulfonic acid, and 2-(meth)acrylamido-2-methyl propanesulfonic acid, and salts thereof.

It has been discovered that when the concentration of acrylic acid exceeds about 5 weight percent based on the weight of the monomers used to make the HASE, undesirable amounts of kettle gel tend to form during the polymerization of the monomer, causing a reduction in the yield of the HASE. Although this gel can be filtered off to yield a product with acceptable stability properties, the addition of small amounts of the sulfonic acid monomer or salt thereof has been found to substantially reduce the amount kettle gel while maintaining the desired viscosity stability and low gel formation in the subsequently prepared paint formulation. The concentration of structural units of sulfonic acid monomer or salt thereof is preferably from 0.1, more preferably from 0.2, and most preferably from 0.5 weight percent; to 5, more preferably 2, and most preferably 1.5 weight percent, based on the weight of the HASE.

The composition of the present invention is useful for making coating compositions and may include a variety of additional components including one or more of the following: Pigments such as $TiO_2$; fillers; dispersants; defoamers; surfactants; biocides; extenders; bases; colorants; as well as non-vinyl acetate binders and non-HASE thickeners.

It has been surprisingly discovered that a paint containing a Vinyl acetate copolymer based binder thickened with the HASE as specified herein exhibits excellent heat aged KU, Brookfield and ICI stability with little or no formation of gel.

EXAMPLES

Abbreviations

| Abbreviation | Name |
|---|---|
| HEC | Cellosize ™ ER-15M |
| EA | Ethyl acrylate |
| MAA | Methacrylic Acid |
| AA | Acrylic Acid |
| APS | Ammonium persulfate |
| AMPS | 2-Acrylamido-2-methylpropane sulfonic acid, sodium salt |
| MM-1 | Lipophilically modified macromonomer having a linear saturated $C_{16-18}$ alkyl group connected through from 18 to 26 oxyethylene residues to a methacryloyl group |
| MM-2 | Lipophilically modified macromonomer having a linear saturated $C_{10-14}$ alkyl group connected through 20-28 oxyethylene residues to a methacryloyl group. |

-continued

| Abbreviation | Name |
|---|---|
| n-DDM | n-Dodecyl mercaptan |
| SLS | Sodium lauryl sulfate, 28% active |
| FES-32 | Disponil FES-32 surfactant, 30% active |
| ALMA | Allyl methacrylate |
| KTPP | Potassium tetraphosphate |
| Dispersant | TAMOL ™ 983 Dispersant |
| $TiO_2$ | Ti-Pure R-706 $TiO_2$ |
| Defoamer | BYK-022 Defoamer |
| Biocide | KATHON ™ LX Biocide 1.5% |
| Mistron | Mistron 353 Extender |
| Omyacarb UF | Omyacarb UF Extender |
| Snowflake | Snowflake Extender |
| VOX 1000 | AEPD ™ VOX 1000 Amine |
| VAE Binder | Mowilith LDM 1871 Binder |

TAMOL, KATHON, and AEPD are Trademarks of The Dow Chemical Company or Its Affiliates.

In the following examples, particle size was determined using a Brookhaven BI-90 particle size analyzer; molecular weights were determined by gel permeation chromatography (GPC) using polyacrylic acid standards ranging in $M_p$=216 to $M_p$=1,100,000. The polymer sample was prepared for GPC analysis by high temperature hydrolysis with KOH and ethanol at 180° C. for 2-3 days in a high pressure Parr Digestion Reactor. The resulting solid polymer was cooled and removed from the bomb, washed with ethanol, and dried. The dried polymer was dissolved in 20 mM phosphate buffer solution and analyzed by GPC under the following conditions:

Analytical Parameters

Instrument: Agilent 1100 HPLC system with isocratic pump, vacuum degasser, S̲ variable injection size autosampler, and column heater, or equivalent.

Detector Agilent 1100 HPLC G1362A Refractive Index detector, or equivalent

Software: Agilent ChemStation, version B.04.02 with Agilent GPC-Addon version B.01.01

Column Set: TOSOH Bioscience TSKgel G2500PW×17.8 mm ID×30 cm, 7 μm column (P/N 08020) with TOSOH Bioscience TSKgel GMPW×17.8 mm ID×30 cm, 13 μm (P/N 08025).

Method Parameters

Mobile Phase: 20 mM Phosphate buffer in MilliQ HPLC Water, pH~7.0

Flow Rate: 1.0 mL/min

Injection volume: 20 μL

Column temperature: 35° C.

Run time: 30 min

Comparative Intermediate Example 1

Preparation of HASE without Acrylic Acid

FES-32 (37 g) and water (1084 g) were charged into a 5-L, 4-neck round bottom flask equipped with a water condenser, electric agitator, electronic thermocouple, and a nitrogen sweep and heated to 86° C. Meanwhile, monomer emulsion (ME) was prepared by first mixing at ambient temperature FES-32 (37 g) and water (977 g) in a 4-L wide mouth beaker. MM-1 (18.47 g) was added slowly to the beaker with mixing, followed by the slow addition of EA (762.8 g). MAA (513.5 g) was then added slowly with continued mixing to complete the preparation of the ME. When the reaction flask reached 86° C., APS (1.43 g) dissolved in water (15 g+20 g rinse) was added to the flask in one shot. Two minutes later, the ME feed was started at a rate of 21 g/min. Simultaneously, a separate delay feed of an aqueous solution of APS (0.57 g in 120 g water) was started at a rate of 1.09 g/min. After the ME feed was completed (100 min) the ME feed line was rinsed with water (65 g). The reaction mixture was held at 86° C. with stirring for an additional 5 min. The reactor was then cooled to 75° C., at which time dilution water (30 g) was added, and further cooled 60° C. Remaining free monomer in the kettle was chased by addition of 0.15% active ferrous sulfate heptahydrate (26 g); followed by 70% aqueous t-butyl hydroperoxide (1.14 g) diluted in water (15 g) and rinsed with water (6 g); then isoascorbic acid (0.57 g) dissolved in water (15 g), and rinsed with additional water (6 g). The stirring was continued for 15 min and the chase was repeated. The reaction flask was cooled to 25° C.; when the temperature reached 40° C., a solution of sodium acetate (3.29 grams) and water (330 g plus 30 g of a water rinse) was added. Finally, 1.5% Biocide (9.72 g) dissolved in water (150 g) was added to the reaction flask slowly over 10 min followed by a water rinse (30 g). The batch was then filtered through double stacked 100 mesh and 325 mesh US standard screens to remove any gel from the emulsion. The polymer was found to have a solids content of 29.2%; a pH of 4.35; a particle size of 93.1 nm; a Brookfield Viscosity of 3.3 cps; a residual monomer content of 1.5 ppm; a hydrolyzed polymer $M_w$ of 731,000 Daltons; and a $M_w/M_n$ of 10.8.

Comparative Intermediate Example 2

Preparation of HASE with Higher Methacrylic Acid Content and no Acrylic Acid

FES-32 (37 g) and water (1084 g) were charged to a 5-L, 4-neck round bottom flask equipped with a water condenser, electric agitator, electronic thermocouple, and a nitrogen sweep and heated to 86° C. Meanwhile, monomer emulsion (ME) was prepared by first mixing FES-32 (37 g) and water (977 g) in a 4-L wide mouth beaker at ambient temperature. MM-1 (18.47 g) was added slowly to the beaker, with mixing, followed by the slow addition of EA (698.2 g). MAA (578.2 g) was then added slowly with continued mixing to complete the preparation of the ME. When the reaction flask reached 86° C., APS (1.43 g) dissolved in water (15 g+20 g rinse) was added in one shot to the reaction flask. Two minutes later, the ME feed was started at a rate of 21 g/min. Simultaneously, a separate delay feed of an aqueous solution of APS (0.57 g APS in 120 g water) was started at a rate of 1.09 g/min. After the ME feed was completed (100 min) the ME feed line was rinsed with water (65 g). Upon completion of feeding, the reaction contents were cooled to 75° C. and dilution water (30 g) was added. Cooling continued to 60° C. and free monomer was chased as described in Comparative Example 1. The polymer was found to have a solids content of 29.5%; a pH of 4.23; a particle size of 117.4 nm; a Brookfield Viscosity of 8.2 cps; a residual monomer content of <1 ppm; a hydrolyzed polymer $M_w$ of 811,000 Daltons; and a $M_w/M_n$ of 11.7.

Intermediate Example 1

Preparation of HASE with AA

The procedure of Comparative Example 1 was substantially followed except that acrylic acid (64.65 g) was added in addition to the MAA (513.5 g) in the preparation of the monomer emulsion. The polymer was found to have a solids content of 29.4%; a pH of 4.02; a particle size of 148 nm; a Brookfield Viscosity of 6.5 cps; a residual monomer content of <1 ppm; a hydrolyzed polymer $M_w$ of 790,000 Daltons; and a $M_w/M_n$ of 11.6.

Intermediate Example 2

Preparation of HASE with AA and AMPS

SLS (37.0 g), AMPS (50% solution in water; 25.86 g) and water (1071.1 g) were charged into a 5-L, 4-neck round bottom flask equipped with a water condenser, electric agitator, electronic thermocouple, and a nitrogen sweep and heated to 86° C. Meanwhile, ME was prepared by mixing together SLS (37.0 g) and water (977 g) in a 4-L wide mouth beaker at ambient temperature. MM-1 (18.47 g) was added slowly to the beaker with mixing, followed by the slow addition of EA (698.2 g), then slow addition of MAA (435.9 g), then AA (129.3 g). A portion of the ME (135 g) was added to the reaction kettle followed by a one shot addition of APS (1.43 g) dissolved in water (15 g), followed by a water rinse (20 g). Then, aqueous APS (0.57 g APS dissolved in 120 g water) and the remainder of the ME were added over 2 h. The ME and APS feed lines were then rinsed with water. The reaction mixture was held at 86° C. with stirring for an additional 5 min, then the reactor was cooled to 75° C.; dilution water (30 g) was then added, and the reactor was further cooled 60° C. Remaining free monomer in the kettle was chased as substantially as described in Comparative Intermediate Example 1. The polymer was found to have a solids content of 30.0%; a pH of 4.04; a particle size of 192 nm; a Brookfield Viscosity of 36.5 cps; a residual monomer content of <1 ppm; a hydrolyzed polymer $M_w$ of 811,000 Daltons; and a $M_w/M_n$ of 11.7.

Comparative Intermediate Example 3

Preparation of HASE with n-DDM and no AA

SLS (37.4 g) and water (1130 g) were charged into a 5-L, 4-neck round bottom flask equipped with a water condenser, electric agitator, electronic thermocouple, and a nitrogen sweep and heated to 86° C. A monomer emulsion (ME) was prepared by mixing together SLS (37.4 g) and water (1475 g) in a 4-L wide mouth beaker at ambient temperature. MM-1 (64.4 g) was added slowly to the beaker with mixing, followed by addition of MM-2 (23.3 g), followed by the slow addition of EA (655.2 g), then slow addition of MAA (569.3 g), then n-DDM (2.09 g). A portion of the ME (135 g) was added to the reaction kettle with stirring, causing a drop in temperature to 76-78° C. Immediately following completion of the addition of the ME, APS (1.4 g) dissolved in water (20 g) was added in one shot to the kettle followed by a 5-g water rinse. The temperature of the contents rose by exotherm to 85° C., whereupon aqueous APS (1.0 g in 100 g of water) and the remainder of the ME were added over 2 h. The ME and APS feed lines were rinsed with water and the reaction mixture was stirred for 5 min. The contents were cooled to 70° C. and dilution water (75 g) was added. Cooling continued to 60° C. and free monomer was chased as described in Comparative Example 1. The polymer was found to have a solids content of 31.1%; a pH of 2.84; a particle size of 100 nm; a Brookfield Viscosity of 6.5 cps; a residual monomer content of 23 ppm; a hydrolyzed polymer $M_w$ of 340,000 Daltons; and a $M_w/M_n$ of 15.1.

Intermediate Example 3

Preparation of HASE with n-DDM and AA

The procedure for Comparative Intermediate Example 3 was substantially followed except that MAA (438.7 g) and AA (130.6 g) were used instead of MAA alone (563.3 g). The polymer was found to have a solids content of 29.4%; a pH of 2.62; a particle size of 182.8 nm; a Brookfield Viscosity of 5.7 cps; a residual monomer content of 0.9 ppm; a hydrolyzed polymer $M^w$ of 328,000; and a $M_w/M_n = 10.97$.

The compositions of the intermediate examples and comparative intermediate examples are summarized in Table 1.

TABLE 1

Summary of Experimental and Comparative Polymer Compositions

| Polymer | Polymer composition |
|---|---|
| Int. Ex 1 | 54EA/40MAA/5AA/1MM-1 |
| Int. Ex 2 | 54EA/34MAA/10AA/1AMPS/1MM-1 |
| Int. Ex 3 | 50.2EA/35.1MAA/10AA/1.25MM-1/3.45MM-2/0.185nDDM |
| C. Int Ex1 | 59EA/40MAA/1MM-1 |

TABLE 1-continued

Summary of Experimental and Comparative Polymer Compositions

| Polymer | Polymer composition |
|---|---|
| C. Int Ex2 | 54EA/45MAA/1MM-1 |
| C. Int Ex3 | 50.2EA/45.1MAA/1.25MM-1/3.45MM-2/0.185nDDM |

Paints were prepared as 249-g batches (~180 mL), adjusted to viscosity with thickener, adjusted to pH 8.9 with VOX 1000, and adjusted to target total mass with water. The formulation is summarized in Table 2.

TABLE 2

VAE Binder-HASE Paint Formulation

| | g |
|---|---|
| Grind | |
| Water | 34.95 |
| NaOH (10%) | 0.25 |
| Dispersant | 0.75 |
| KTPP | 0.12 |
| Defoamer | 0.5 |
| Biocide | 0.25 |
| $TiO_2$ | 34.95 |
| Mistron | 34.95 |
| Omyacarb UF | 12.48 |
| Snowflake | 34.95 |
| Water | 6.24 |
| Grind Sub-total | 160.39 |
| LetDown | |
| VAEBinder | 54.92 |
| Water | 4.99 |
| Defoamer | 0.5 |
| VOX 1000 | 0.05 |
| HASE Thickener (30% w/w) | 2.2 |
| Water | 26.36 |
| Totals | 249.4 |

Thickener performance was measured and shown in Table 3. In the table, lbs refers to dry pounds of thickener per 100 gal of paint; $KU_i$ refers to the initial KU viscosity in Krebs units; $KU_f$ refers to the heat aged KU viscosity in Krebs units; $\Delta KU$ is $KU_f-KU_i$; $Bf_i$ refers to the initial Brookfield viscosity using DV-I spindle 4 at 6 rpm; $Bf_f$ refers to the heated aged Brookfield viscosity using DV-I spindle 4 at 6 rpm; $\Delta Bf$ is $Bf_f-Bf_i$. Heat aging for Intermediate Example 1 (Comp. Ex. 1) was done at 50° C. for 5 days; heat aging for Comparative Example 2 (Comp. Ex. 2) was done at 50° C. for 3 days; for all other examples, heat aging was done at 50° C. for 10 days. Gel rating was refers to a scale of 0-5, with 0 being to a stable paint after heat aging and 5 being a gelled paint.

TABLE 3

HASE Thickener Performance in VAE Binder Based Paint

| | | | | Heat Aged Paint Sample | | | | |
|---|---|---|---|---|---|---|---|---|
| Example | lbs | $KU_i$ | $Bf_i$ | $KU_f$ | $\Delta KU$ | $Bf_f$ | $\Delta Bf$ | Gel |
| HEC | 4.60 | 105.3 | 17,300 | 102.2 | -3.1 | 18,600 | 1,300 | 0 |
| Comp. Ex1 | 3.95 | 100.1 | 21,800 | Gel[4] | Gel | 43,900 | 22,100 | 5 |
| Comp. Ex2 | 3.60 | 105.5 | 16,200 | 116.6[5] | 11.1[5] | 19,100 | 2,900 | 3 |
| Ex1 | 3.70 | 100.3 | 18,700 | 110.2 | 9.9 | 29,500 | 10,800 | 1-2 |
| Ex2 | 3.84 | 108.7 | 37,200 | 112.3 | 3.6 | 42,700 | 5,500 | 1 |

The results show that increasing total acid monomer and adding acrylic acid improves HASE performance. Paint Example 2, which included a HASE thickener with 10 parts acrylic acid and 1 part AMPS was especially stable to heat aging and showed acceptable levels of gel formation.

Table 4 shows the effect of higher lower Mw and higher macromonomer content in a HASE thickener on paint stability. In these experiments, heat aging was carried out for 10 days at 50° C.

TABLE 2

Low $M_w$ HASE Thickener Performance in VAE Paint

| Example | lbs | $KU_i$ | $Bf_i$ | Heat Aged 10 d[2] | | | | |
|---|---|---|---|---|---|---|---|---|
| | | | | $KU_f$ | $\Delta KU$ | $Bf_f$ | $\Delta Bf$ | Gel |
| Comp Ex3 | 4.36 | 113.8 | 19,700 | 136 | 22.2 | 36,400 | 16,700 | 3 |
| Ex3 | 3.94 | 111.2 | 21,200 | 120.6 | 9.4 | 27,400 | 6,200 | 1 |

As Table 4 illustrates, $\Delta KU$ and gel formation is significantly improved for a VAE based paint that contains a relatively low $M_w$ HASE thickener that comprises structural units of both methacrylic acid and acrylic acid. The significance of 5 parts structural units of acrylic acid in the HASE thickener is manifested by the fact that the total acid content was the same (45 parts) in both samples.

The invention claimed is:

1. A composition comprising an aqueous dispersion of a) a vinyl acetate copolymer having a $T_g$ in the range of -10° C. to 50° C. and b) a hydrophobically modified alkali soluble emulsion (HASE) comprising, based on the weight of the HASE: i) from 45 to 60 weight percent structural units of ethyl acrylate; ii) from 30 to 45 weight percent structural units of methacrylic acid; iii) from 2.0 to 20 weight percent structural units of acrylic acid; iv) from 0.1 to 5 weight percent structural units of a sulfonic acid monomer or a salt thereof; and v) from 0.1 to 10 weight percent structural units of hydrophobic macromolecular groups represented by either of the following structures:

$$R^a—(OR^b)_x—(OR^c)_y—OC(O)—CR^d=CH_2$$

or $$R^a—(OR^b)_x—(OR^c)_y—OC(O)—NH—C(CH_3)_2-(Ph)-CR^d=CH_2$$

where $R^a$ is a $C_8$-$C_{24}$ alkyl or aralkyl group; x+y is 10 to 100; $R^b$ and $R^c$ are each independently $CH_2CH_2$, $CH_2CH(CH_3)$, or $CH_2CH_2CH_2CH_2$; $R^d$ is H or $C_1$-$C_6$-alkyl; and Ph is a phenylene group.

2. The composition of claim 1 wherein the vinyl acetate copolymer is a VAE copolymer, and wherein the HASE comprises from 2 to 15 weight percent structural units of acrylic acid, from 0.1 to 2 weight percent structural units of a sulfonic acid monomer or a salt thereof, and a total acid content of 40 to 48 weight percent, based on the weight of the HASE.

3. The composition of claim 2 wherein the HASE comprises, based on the weight of the HASE, from 45 to 56 weight percent structural units of ethyl acrylate and from 4 to 11 weight percent structural units of acrylic acid.

4. The composition of claim 3 wherein the HASE comprises from 50 to 55 weight percent structural units of ethyl acrylate and from 8 to 11 weight percent structural units of acrylic acid, each based on the weight of the HASE, wherein the sulfonic acid monomer is 2-(meth)acrylamido-2-methyl propanesulfonic acid or a salt thereof.

5. The composition of claim 4 wherein the total acid content is from 43 to 46 weight percent, based on the weight of the HASE.

6. The composition of claim 1 wherein the hydrophobic macromolecular groups are structural units of either or both of following macromonomers:

$$R^a—(OCH_2CH_2)_{(z)}—OC(O)—C(CH_3)=CH_2$$

or $$R^a—(OCH_2CH_2)_{(z)}—OC(O)—NH—C(CH_3)_2-(Ph)-C(CH_3)=CH_2$$

where $R^a$ is a $C_8$-$C_{24}$ alkyl or aralkyl group; z is 10 to 50; and Ph is a phenylene group.

7. The composition of claim 1 which further includes one or more of the following components: pigments; fillers; dispersants; defoamers; surfactants; biocides; extenders; bases; a non-vinyl acetate containing binder; or colorants.

* * * * *